United States Patent
Shimosakoda

(10) Patent No.: US 6,546,065 B1
(45) Date of Patent: Apr. 8, 2003

(54) FRAME SYNCHRONOUS CIRCUIT

(75) Inventor: Yoshinori Shimosakoda, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/326,549

(22) Filed: Jun. 7, 1999

(30) Foreign Application Priority Data

Jan. 28, 1999 (JP) ............................................. 11-020273

(51) Int. Cl.[7] ................................................. H04L 7/06
(52) U.S. Cl. ........................ 375/364; 375/354; 375/362; 375/365; 375/368
(58) Field of Search ................................ 375/364, 362, 375/365, 366, 368, 354; 370/491, 500, 509, 515, 470

(56) References Cited

U.S. PATENT DOCUMENTS 4,965,814 A * 10/1990 Yoshida et al. ............. 375/362
5,757,869 A * 5/1998 Sands et al. ................ 375/366
5,953,378 A * 9/1999 Hotani et al. ............... 375/341
5,963,605 A * 10/1999 Yasui .......................... 375/368

FOREIGN PATENT DOCUMENTS

| JP | 8-32573 | 2/1996 |
| JP | 8-102732 | 4/1996 |
| JP | 8-274768 | 10/1996 |

* cited by examiner

*Primary Examiner*—Shuwang Liu
(74) *Attorney, Agent, or Firm*—Volentine Francos, PLLC

(57) ABSTRACT

After a pseudo synchronizing information is detected and a synchronization is lost, an arithmetic operation unit adds a random number outputted from a random number generator to a frame length information calculated. The detection of a synchronizing information is again executed in a stream counter to a bit stream of a plurality of continuous transmission data, from a bit located in delay for the bit of output information being a calculation result by the arithmetic operation unit. The frame synchronous circuit thus constructed achieves a synchronization setup securely in a high speed, if a transmission data containing a pseudo synchronizing information is transmitted.

10 Claims, 7 Drawing Sheets

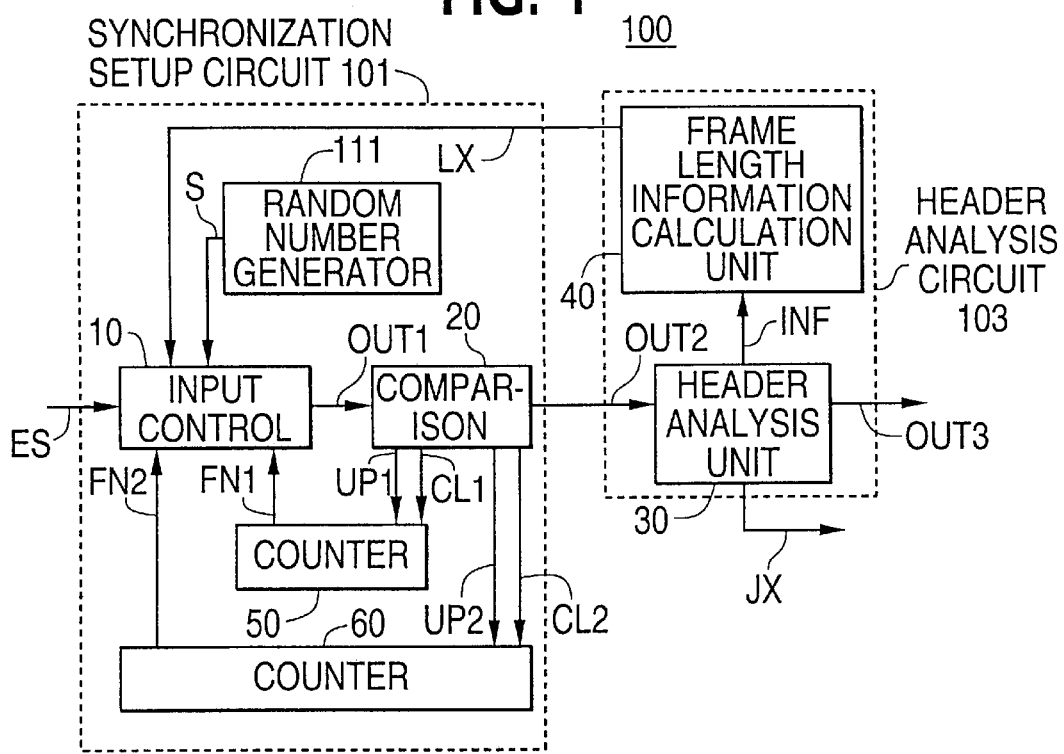
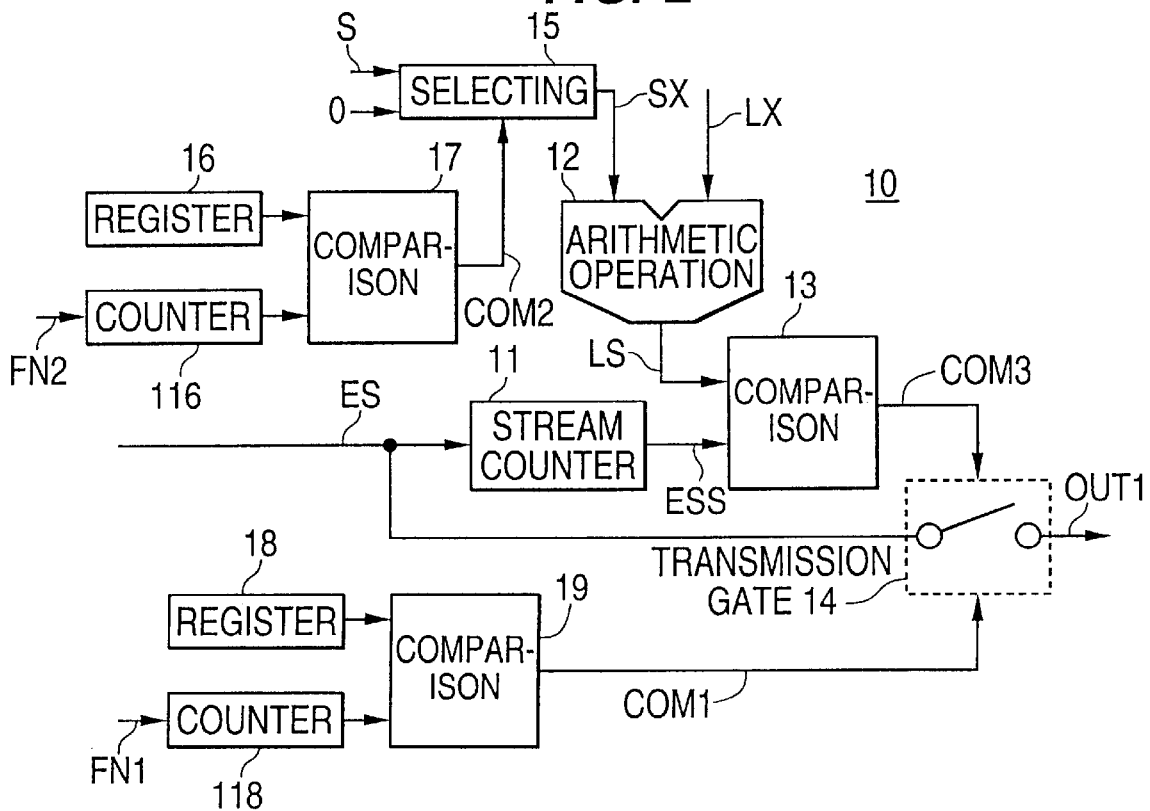

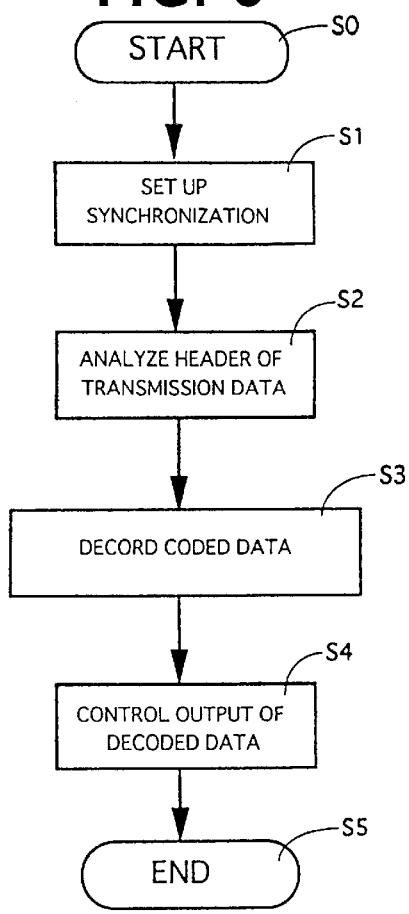
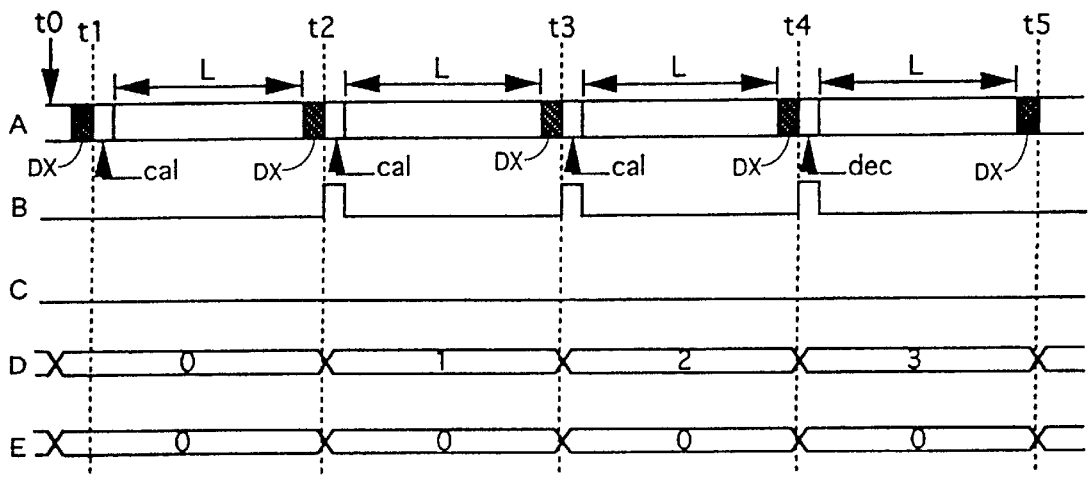

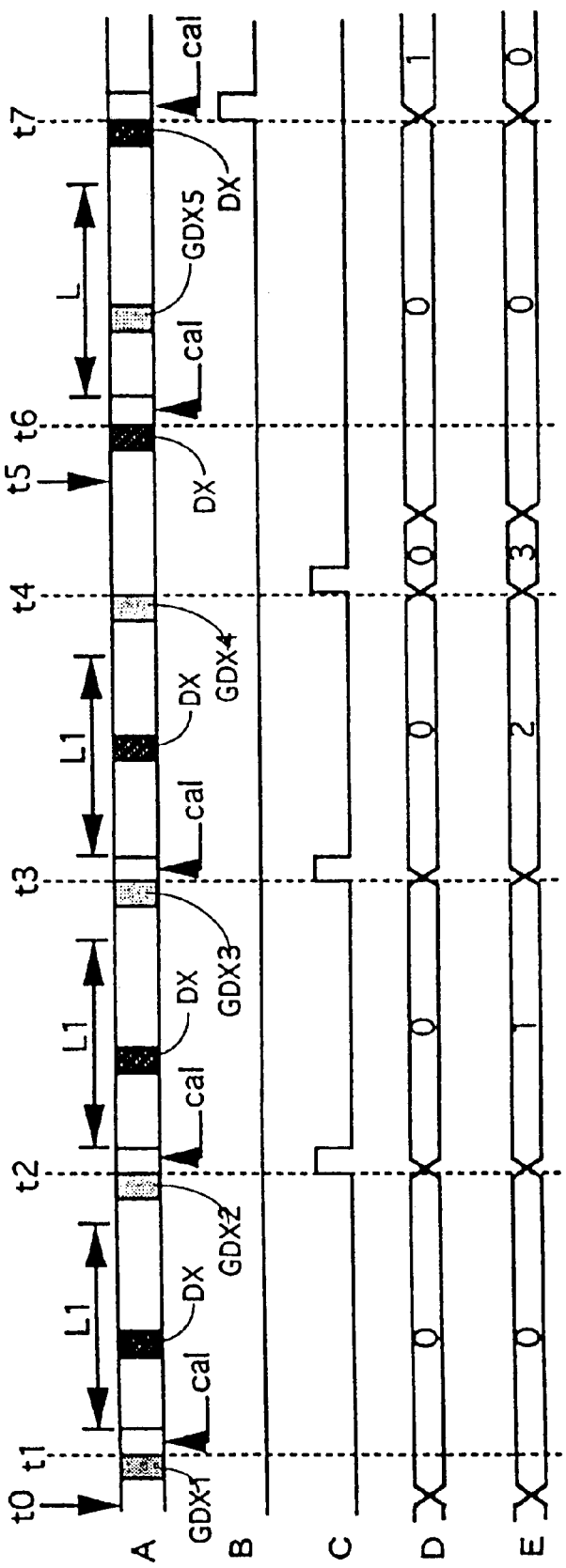

FRAME SYNCHRONOUS CIRCUIT

BACKGROUND OF THE INVENTION

1. Field of the Invention

The present invention relates to a frame synchronous circuit, specifically to a frame synchronous circuit incorporated in a decoder that decodes audio signals as transmission data transmitted from a digital communication or a digital broadcasting station in the digital television.

2. Description of the Related Art

In recent years, the digital television and the digital broadcasting employing the digital communication system have been widespread. The digital television and the digital broadcasting transmit the audio signals in which image data and the like are digitized (or, coded). The receiver to receive the audio signals needs to decode the audio signals, and it possesses a decoder.

The audio signal includes a transmission data by each frame, and the transmitter transmits a plurality of the transmission data by each frame in a form of continuous bit strings. Such continuous bit strings of the transmission data by each frame is called as a bit stream. Normally, a transmission data by each frame includes a synchronizing information and an information to indicate the frame length of the transmission data, in addition to a coded data to be decoded. The synchronizing information is an information to indicate the start of the transmission data by each frame, which is basically allocated at the leading part of the transmission data and contained in each of the transmission data as the information of the same contents (for example, "0 x f f f" in MPEG). The information to indicate the frame length is one information contained in an information group generally called as the header, which indicates the frame length of the transmission data by each frame. The header having the information to indicate the frame length is allocated next to the synchronizing information. In order to extract each of the transmission data from a bit stream, the decoder to decode the audio signal possesses a frame synchronous circuit.

The frame synchronous circuit detects an information equivalent to a synchronizing information of the transmission data from the bit stream. When the information equivalent to the synchronizing information is detected, a frame length of the transmission data having the information equivalent to the detected synchronizing information is calculated and determined, on the basis of the information to indicate the frame length contained in the header to be allocated after the synchronizing information. The determination of the frame length confirms, also with respect to the transmission data transmitted in the form of a bit stream, that the subsequent transmission data starts at a bit part received in delay for the frame length of the transmission data from which the synchronizing information is detected.

In other words, if a normal synchronizing information is correctly detected, a subsequent synchronizing information of the transmission data is to be present at the bit part received in delay for the determined frame length of the transmission data from which the synchronizing information is detected. Accordingly in the subsequent operations, the synchronizing information of continuous transmission data can be detected securely, on the basis of the frame length of each of the transmission data. Provided that the detection of the synchronizing information is executed for one time or several times, and the synchronizing information is judged to be securely obtained (when the synchronizing information is obtained continuously for the several times in case of executing several times), the synchronization is considered to have been set up from such operations.

When the synchronization has been set up in a frame synchronous circuit, the frame synchronous circuit outputs a synchronizing signal to indicate that the synchronization has been set up to the circuits on the subsequent stage, and transmits a bit stream to the circuit on the subsequent stage. The circuits on the subsequent stage are able to securely execute desired processings (for example, decoding of the data) to the transmission data inputted in a bit stream on the basis of the synchronizing signal.

However, the transmission data can contain an information having the same content as the synchronizing information, at a disposition different from that of the synchronizing information. Such an information as should not be used in itself as the synchronizing information is called a pseudo synchronizing information. And, in case of transmitting image data and character data as the transmission data, it can happen that a plurality of transmission data of the same contents or similar contents are transmitted continuously. The transmission data having the same contents include a kind of a test signal of a sine wave.

In the frame synchronous circuit, the detection of the synchronizing information is executed to the transmission data transmitted in a bit stream, from the bit part having been transmitted to the frame synchronous circuit; that is, the detection of the synchronizing information is not necessarily executed from the leading part of the transmission data. Accordingly, as to the transmission data including a pseudo synchronizing information, the frame synchronous circuit can happen to detect this pseudo synchronizing information as a normal synchronizing information. The synchronization as above cannot be set up as to such a pseudo synchronizing information, namely, the so-called synchronization loss is created.

In other words, in the frame synchronous circuit, when the detection of a synchronizing information is executed from a transmission data for one time, if a pseudo synchronizing information is detected by chance, it will lead to transmitting a synchronizing signal at a wrong timing on the basis of this pseudo synchronizing information. Accordingly, the subsequent processing to the transmission data, for example, the decoding of the transmission data cannot appropriately be executed.

And as mentioned above, in the frame synchronous circuit, when the detection of a synchronizing information is executed for plural times from a plurality of transmission data, if a pseudo synchronizing information is detected, an information allocated next to the pseudo synchronizing information is forcibly used as the header. Accordingly, this will lead to determining the frame length on the basis of the information not being the header. As a result, it can happen that the determined frame length becomes shorter or longer than the proper frame length for the transmission data. The frame length determined when a pseudo synchronizing information is detected frequently becomes shorter than the proper frame length.

Thus, since the detection of the synchronizing information relating to the subsequent transmission data is executed on the basis of a wrong frame length, the detection of the synchronizing information relating to the subsequent transmission data is delayed, and the setup of synchronization takes a longer time.

And as mentioned above, when a plurality of similar transmission data such as image data, character data, or the like are transmitted continuously as a transmission data, the frame length determined is different from the proper frame length; for example, it is shorter than the proper frame length, which, after the detection of a pseudo synchronizing information, will lead to continuously producing a plurality of information different from the synchronizing information. Accordingly, it will not only take more time to obtain the proper synchronizing information, the operation will also fall into such a state that only such a pseudo synchronizing information can be obtained. In this case, the frame synchronous circuit cannot get out of the state to detect the pseudo synchronizing information. In consequence, the synchronization will not be set up indefinitely, the transmission data will not be transmitted to the subsequent devices, and the processing will not be performed by the subsequent devices (for example, the decoding of the transmission data). Once the frame synchronous circuit falls into such a state, it becomes impossible to deliver the output signal as the whole device containing the decoder.

Further, accompanying with the trend of downsizing the electronics and the widespread of portable equipment in recent years, it becomes necessary to make the decoder smaller, and to avoid a significant increase in the frame synchronous circuit construction as well.

The present invention has been made in view of the foregoing problems, and it is an object of the invention to provide a frame synchronous circuit that sets up the synchronization securely in a high-speed, even though a transmission data including a pseudo synchronizing information is transmitted.

Further, the invention intends to provide a frame synchronous circuit that suppresses increase of the components to the utmost and achieves the foregoing object.

SUMMARY OF THE INVENTION

In order to accomplish the foregoing objects, a frame synchronous circuit disclosed in this invention receives transmission data continuously which include at least synchronizing information and information indicating frame lengths, detects the synchronizing information of the transmission data, and sets up a synchronization to the transmission data. The frame synchronous circuit is made up with the following components: an input control unit that sequentially receives the transmission data, and on the basis of the frame length information of a preceding transmission data controls to send out a subsequent transmission data; a synchronizing information comparison unit that detects an information equivalent to the synchronizing information from the transmission data sent from the input control unit, compares the information detected as the synchronizing information with a predetermined information, and outputs an indication information that indicates a coincidence or non-coincidence of the comparison; a frame length determination unit that determines a frame length on the basis of the information indicating the frame lengths contained in the transmission data, and outputs the frame length as a frame length information; and a counter that counts a detected number of times of the coincidence and a detected number of times of the non-coincidence in accordance with the indication information, and outputs a control signal when the detected number of times of the non-coincidence reaches a predetermined number of times.

And, in the foregoing construction, the input control unit varies the frame length information inputted from the frame length determination unit in accordance with the control signal, and controls to send out the transmission data on the basis of the frame length information varied.

BRIEF DESCRIPTION OF THE DRAWINGS

FIG. 1 is a circuit diagram of a frame synchronous circuit 100 in the first embodiment of the invention;

FIG. 2 is a circuit diagram of an input control unit 10 in the first embodiment of the invention;

FIG. 6 is a flow chart to illustrate the operation of the decoder illustrated in FIG. 5;

FIG. 7 is a timing chart to explain the operation of the frame synchronous circuit 100 in the first embodiment of the invention, and the timing chart illustrates a case when the synchronization is set up;

FIG. 14 is a timing chart to explain the operation of the frame synchronous circuit 400 in the fourth embodiment of the invention, and the timing chart illustrates a case when the synchronization is lost.

DETAILED DESCRIPTION OF THE PREFERRED EMBODIMENTS

Figure 3:
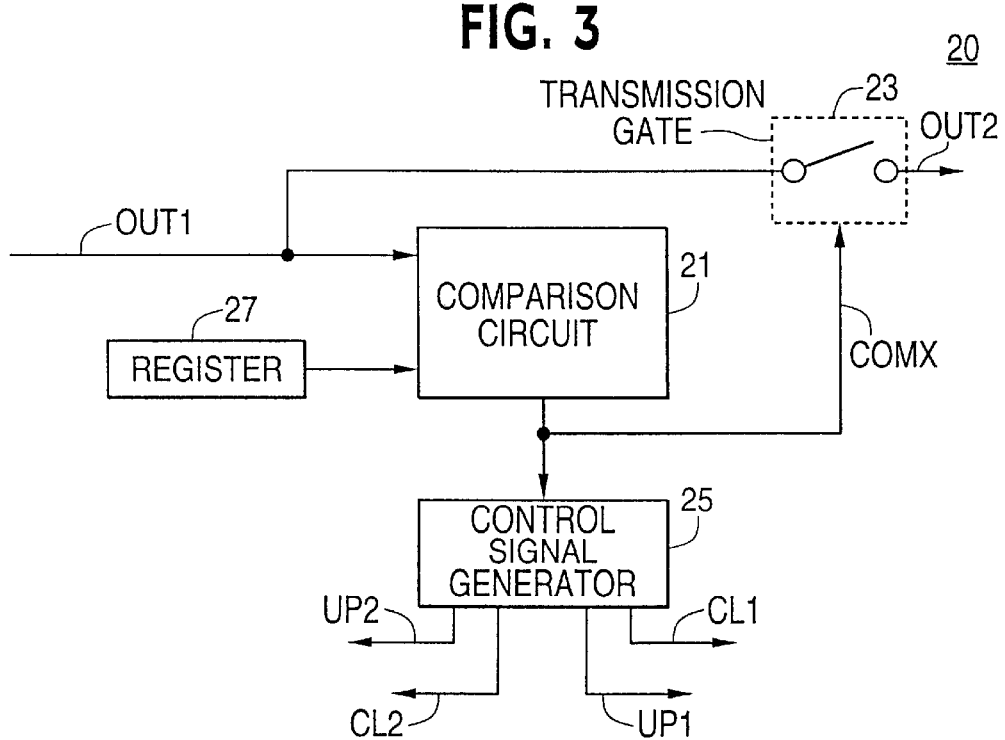
FIG. 3 is a circuit diagram of synchronizing information comparison unit 20 in the first embodiment of the invention.

The frame synchronous circuit of the invention will be described in detail with reference to the accompanying drawings. FIG. 1 is a circuit diagram of the frame synchronous circuit 100 in the first embodiment of the invention. Here, it is assumed that the frame synchronous circuit 100 of the invention is incorporated in a decoder that receives a transmission data from a transmitter and executes the decoding of the transmission data.

In FIG. 1, the frame synchronous circuit 100 is comprises a synchronization setup circuit 101 that sequentially receives a plurality of transmission data transmitted in the form of a bit stream and executes a synchronization setup processing, and a header analysis circuit 103 that analyzes a header information of the transmission data.

The synchronization setup circuit 101 comprises an input control unit 10, synchronizing information comparison unit 20, counters 50, 60, and a random number generator 111 that generates to output a random number.

The input control unit 10 is supplied with a plurality of transmission data ES transmitted in the form of a bit stream called as the Audio Elementary Stream. Further, the input control unit 10 is supplied with a signal FN1 from the counter 50, signal FN2 from the counter 60, random number S outputted from the random number generator 111, and a frame length information LX outputted from the header analysis circuit 103. Here, the counter 50 counts a number of times of coincidence in accordance with a signal indicating a coincidence, which is outputted on the basis of the comparison result of the synchronizing information comparison unit 20 described later. And, the counter 60 counts a number of times of non-coincidence in accordance with a signal indicating a non-coincidence, which is outputted on the basis of the comparison result of the synchronizing information comparison unit 20. The signal FN1 is an overflow information outputted by the counter 50 when it generates an overflow (here, the counter 50 is assumed to reset the count number to "0" when it generates an overflow). The signal FN2 is an overflow information outputted by the counter 60 when it generates an overflow (here, the counter 60 is assumed to reset the count number to "0" when it generates an overflow). In other words, it can be said that the signal FN1 is a coincidence detection signal to indicate that a normal synchronizing information has been obtained for a specific number of times, and the signal FN2 is a control signal to indicate that a pseudo synchronizing signal has been obtained for a specific number of times.

The input control unit 10 transmits, on the basis of a frame length information LX that the header analysis circuit 103 determines in correspondence with the transmission data ES in which the synchronizing information is detected, a next transmission data following the transmission data ES in which the synchronizing information is detected, from the position of a bit data transmitted in delay for the frame length information LX. The input control unit 10 is able to continuously output a plurality of transmission data in a received bit stream on the basis of the signal FN1 from the counter 50. Further, the input control unit 10 modifies the frame length information LX on the basis of the signal FN2 from the counter 60. How to modify the frame length information LX will be described later. The control unit 10 outputs the transmission data as an output signal OUT1 continuously or discontinuously in the form of a received bit stream.

The input control unit 10 will now be described more in detail with reference to FIG. 2. FIG. 2 is a circuit diagram of the input control unit 10.

In FIG. 2, the input control unit 10 includes a stream counter 11, arithmetic operation unit 12, three comparison circuits 13, 17, 19, transmission gate 14, selecting circuit 15, two registers 16, 18, and two counters 116, 118.

The stream counter 11 counts the bit number of the continuous transmission data ES in the form of a bit stream, and outputs a count number ESS thereof. The comparison circuit 13 compares an output information LS being an output data of the arithmetic operation unit 12 and the count number ESS. When both are coincident, the comparison circuit 13 outputs a comparison signal COMP3 whose logical level is, for example, the supply voltage level (hereunder, called as H level), and when both are not coincident, it outputs a comparison signal COMP3 whose logical level is the ground voltage level (hereunder, called as L level). After an initial synchronizing information served as the reference has been detected, for example, and the frame length information of a transmission data in which this synchronizing information has been detected is determined, ,the stream counter 11 executes the count operation. That is, the stream counter 11 counts the bit number of a coded data part of the transmission data ES allocated next to the header. Further, the stream counter 11 starts the counting of the bit number from the coded data part allocated immediately after the header of the transmission data ES in accordance with a control signal outputted in response to the completion of determination of the frame length information LX made by the header analysis circuit 103 described later, for example, after the synchronizing information of the transmission data ES is detected. Further, the stream counter 11 is reset, when the initial synchronizing information is detected, namely, immediately after the device incorporating the frame synchronous circuit 100 is powered, or after the channel of a broadcasting program is switched. Accordingly, the count number ESS of the stream counter 11 is "0" in the initial state.

The arithmetic operation unit 12 executes an arithmetic operation, for example, an addition of the frame length information LX from the header analysis circuit 103 and an information SX being an output data from the selecting circuit 15. The selecting circuit 15 selectively outputs the random number S being the output from the random number generator 111 or "0" in accordance with a comparison signal COMP2, as the output information SX that is added to the arithmetic operation unit 12 with the frame length information LX. That is, when the selecting circuit 15 selectively outputs "0" as the output information SX, the output information LS from the arithmetic operation unit 12 becomes an information equivalent to the number that the frame length information LX possesses. On the other hand, when the selecting circuit 15 selectively outputs the random number S as the output information SX, the output information LS from the arithmetic operation unit 12 becomes a number information in which the random number S is added to the number that the frame length information LX possesses. Here, when the initial synchronizing information is detected, namely, immediately after the device incorporating the frame synchronous circuit 100 is powered, or after the channel of a broadcasting program is switched, the frame length information LX is reset to "0" as the initial state.

The register 16 is a register that holds a predetermined number. In FIG. 2, the information to be held in the register 16 is an information to restrict the number of times for which the counter 60 outputs the signal FN2. The information held in the register 16 may be set from outside so as to be varied arbitrarily, or may be a fixed value. In case of the former, a user is able to set arbitrarily; and in case of the latter, there is not any construction (for example, outer terminals, etc.) required for holding the information in the register 16. The counter 116 counts the number of times for which the counter 60 outputs the signal FN2 (for example, one one-shot pulse is generated in the signal FN2 by each overflow), and outputs a count number of this number of times.

The comparison circuit 17 compares the information held in the register 16 and the count number being the output from the counter 116. Assuming that the counter 60 is a two-bit counter, for example, the counter 60 outputs the signal FN2 one time, when it obtains an information different from the normal synchronizing information four times. Therefore, if the register 16 is holding "2" as an information, the counter 60 outputs the one-shot pulse two times as the signal FN2, when it obtains the information different from the normal synchronizing information eight times. As a result, the comparator 17 detects a coincidence, when the information different from the normal synchronizing information is obtained eight times. When detecting a coincidence, the comparison circuit 17 outputs the comparison signal COM2 of H level as the logical level, for example; and when detecting a non-coincidence, it outputs the comparison signal COM2 of L level as the logical level. FIG. 2 illustrates a case that the selecting circuit 15 selects the random number S when the comparison signal COM2 is in H level, and the selecting circuit 15 selects "0" when the comparison signal COM2 is in L level.

Here, when the initial synchronizing information is detected, namely, immediately after the device incorporating the frame synchronous circuit 100 is powered, or after the channel of a broadcasting program is switched, the counter 116 is reset to "0" in the initial state; and the comparison circuit 17 outputs the comparison signal COM2 of L level. Therefore, the selecting circuit 15 selectively outputs "0" as the output information SX in the initial state.

Further, even though the signal FN2 outputted from the counter 60 is not outputted every time when the counter 60 overflows, if the signal FN2 indicates a count number, the counter 116 may be removed. In this case, the same operation as the above case can be achieved by setting "8" in the register 16.

Further, the function of the counter 116 may be embedded in the counter 60. In this case, the signal FN2 becomes equivalent to the output signal of the counter 116. Further, in case that the function of the counter 116 is embedded in the counter 60, if it is presumed that the counter 60 is to count up to eight count, the information held in the register 16 is "1", and the counter 116 is a one-bit counter, the signal FN2 to indicate the state of overflow may be directly supplied to the selecting circuit 15 so that the selecting circuit 15 can perform the selecting processing thereof. If this is arranged, the same operation as the foregoing example can be implemented without using the register 16 and the comparison circuit 17.

The register 18 is a register that holds a predetermined number. In FIG. 2, the information to be held in the register 18 is an information to restrict the number of times for which the counter 50 outputs the signal FN1. The information held in the register 18 may be set from outside so as to be varied arbitrarily, or may be a fixed value. In case of the former, a user is able to set arbitrarily; and in case of the latter, there is not any construction (for example, outer terminals, etc.) required for holding the information in the register 18. The counter 118 counts the number of times for which the counter 50 outputs the signal FN1 (for example, one one-shot pulse is generated in the signal FN1 by each overflow), and outputs a count number of this number of times.

The comparison circuit 19 compares the information held in the register 18 and the count number being the output from the counter 118. Assuming that the counter 50 is a two-bit counter, for example, the counter 50 outputs the signal FN1 one time, when it obtains the normal synchronizing information four times. Therefore, if the register 18 is holding "2" as an information, the counter 50 outputs the one-shot pulse two times as the signal FN1, when it obtains the normal synchronizing information eight times. As a result, the comparator 19 detects a coincidence, when the normal synchronizing information is obtained eight times. When detecting a coincidence, the comparison circuit 19 outputs the comparison signal COM1 of H level as the logical level, for example; and when detecting a non-coincidence, it outputs the comparison signal COM1 of L level as the logical level.

Further, even though the signal FN1 outputted from the counter 50 is not outputted every time when the counter 50 overflows, if the signal FN1 indicates a count number, the counter 118 may be removed. In this case, the same operation as the above case can be achieved by setting "8" in the register 18.

Further, the function of the counter 118 may be embedded in the counter 50. In this case, the signal FN1 becomes equivalent to the output signal of the counter 118. Further, in case that the function of the counter 118 is embedded in the counter 50, if it is presumed that the counter 50 is to count up to eight count, the information held in the register 18 is "1", and the counter 118 is a one-bit counter, the signal to indicate the state of overflow may be a signal equivalent to the comparison signal COM1. If this is arranged, the same operation as the foregoing example can be implemented without using the register 18 and the comparison circuit 19.

The transmission gate 14 controls to output the transmission data ES inputted to the input control unit 10 as the output signal OUT1, in accordance with the comparison signals COMP1, COMP3. When the comparison signal COMP1 becomes H level, the transmission gate 14 is brought into the active state, which makes it possible to continuously output the transmission data ES as the bit stream. And, when the comparison signal COMP3 becomes H level, the transmission gate 14 is brought into the active state for a certain period of time (for example, until the synchronizing information of a new transmission data is detected), which makes it possible during the period to output the transmission data ES as the bit stream. When the comparison signals COMP1, COMP3 are otherwise, the transmission gate 14 is brought into the non-active state, which inhibits to output the transmission data ES as the bit stream.

As above in the input control unit 10, in the initial state, when the initial synchronizing information is detected, namely, immediately after the device incorporating the frame synchronous circuit 100 is powered, or after the channel of a broadcasting program is switched, both the count number ESS being the output of the stream counter 11 and the output information LS of the arithmetic operation unit 12 become "0". As mentioned above, thatthe output information LS of the arithmetic operation unit 12 becomes "0" results from that the selecting circuit 15 selectively outputs "0" as the output information SX in the initial state and the frame length information is also "0" as the initial state. Accordingly, detecting a coincidence, the comparison circuit 13 outputs the comparison signal COM3 of H level as the logical level. Accordingly, the transmission gate 14 is made active. In consequence, since the initial synchronizing information of the transmission data ES transmitted as a bit stream is detected, and the transmission data ES is sent out to the synchronizing information comparison unit 20 as the output signal OUT1.

When an information equivalent to the initial synchronizing information is detected in the synchronizing information comparison unit 20, the header of the transmission data having the information detected as the synchronizing information is analyzed in the header analysis circuit 103. The frame length information LX of the transmission data having the information detected as the synchronizing information is determined by the analysis of this header, and the determined frame length information LX is transferred to the input control unit 10. The input control unit 10 varies the output information LS of the arithmetic operation unit 12 by the determined frame length information LX, whereby the logical level of the comparison signal COMP3 from the comparison circuit 13 becomes L level. Accordingly, the transmission gate 14 is made non-active, which prohibits the transmission data ES from outputting as the output signal OUT1.

Further, when the transmission gate 14 is made non-active, the stream counter 11 starts the counting operation, in response to the control signal indicating that the header analysis circuit 103 has completed the determination of the frame length information LX. Here, the count operation is started after the header analysis circuit 103 has determined the frame length information LX, and the operation starts at counting the bit number from a coded data directly after a part equivalent to the header of the transmission data having the information detected as the synchronizing information. Further, the count operation of the stream counter 11 may be started in such a manner that the header analysis circuit 103 outputs a signal indicating the end of the header to the stream counter 11, and in response to this signal, the stream counter 11 starts the count operation.

The stream counter 11 counts the bit number of a part equivalent to the coded data of the transmission data ES, and the comparison circuit 13 brings the logical level of the comparison signal COMP3 into H level, when the count number ESS of the stream counter 11 and the output information LS of the arithmetic operation unit 12 are coincident.

And, when the number held in the register 16 and the number held in the counter 116 are coincident, the comparison circuit 17 brings the logical level of the comparison signal COMP2 into H level, which switches the output signal SX of the selecting circuit 15 into the random number S.

And, when the number held in the register 18 and the number held in the counter 118 are coincident, the comparison circuit 19 brings the logical level of the comparison signal COMP1 into H level, which makes the transmission gate 14 active. Since the foregoing operations are repeated thereafter, the state of the synchronization being set up is maintained, until there occurs a next power supply to the device incorporating the frame synchronous circuit 100, a restarting due to an instantaneous power cut or the like, or a channel switching of the broadcasting program.

The input control unit 10 operates as mentioned above, and outputs the output signal OUT1. Next, the synchronizing information comparison unit 20 that receives the output signal OUT1 as its input will be described in detail with reference to FIG. 3. FIG. 3 is a circuit diagram of the synchronizing information comparison unit 20.

In FIG. 3, the synchronizing information comparison unit 20 comprises a comparison circuit 21, transmission gate 23, control signal generator 25, and register 27.

The comparison circuit 21 compares the output signal OUT1 from the input control unit 10 and an information held in the register 27. The register 27 holds an information equivalent to the normal synchronizing information. Therefore, the comparison circuit 21 is to detect the information equivalent to the synchronizing information from the output signal OUT1. In other words, when the initial synchronizing information is detected, namely, immediately after the device incorporating the frame synchronous circuit 100 is powered, or after the channel of a broadcasting program is switched, the comparison circuit 21 detects the initial synchronizing information from the transmission data ES continuously transmitted as the output signal OUT1 in the form of a bit stream. Further, after detecting the initial synchronizing information, the comparison circuit 21 detects whether the information held in the register 27 is coincident with the information equivalent to the synchronizing information of the transmission data ES intermittently transmitted in accordance with the comparison result of the information LS in which the frame length information LX and the information SX selectively outputted from the selecting circuit 15 are added and the count number ESS counted by the stream counter 11.

The comparison circuit 21 outputs the comparison result as a comparison signal COMX. When detecting the coincidence in the foregoing comparison, the comparison circuit 21 outputs the comparison signal COMX of the logical level H, for example; and when detecting the non-coincidence, the comparison circuit 21 outputs the comparison signal COMX of the logical level L.

Further, the information held in the register 27 is preferably arranged so that a user is able to set the information from an outer terminal. The reason is that the content of the synchronizing information differs depending on the compression systems (for example, MPEG, AC3, AAC, etc.). If the information held in the register 27 is made possible to set from an outer terminal, the present invention can be applied to any type of the compression systems, thereby improving the usability. Further, it may be arranged that the synchronizing information corresponding to the compression systems are stored in the other register or memory in advance, and from this register or memory, a desired synchronizing information is held in the register 27. This case requires a control circuit for holding a desired synchronizing information in the register or memory and the register 27; however, it does not require an additional outer terminal and the like, which is advantageous.

The active state of the transmission gate 23 is controlled in accordance with the logical level of the comparison signal COMX. When the logical level of the comparison signal COMX is H level, the transmission gate 23 is brought into the active state, and the output signal OUT1 of the input control unit 10 is outputted as the output signal OUT2 through the transmission gate 23. When the logical level of the comparison signal COMX is L level, the transmission gate 23 is brought into the non-active state, the output signal OUT1 of the input control unit 10 is prohibited from going out as the output signal OUT2.

The control signal generator 25 outputs control signals UP1, CL1, UP2, and CL2 in accordance with the logical level of the comparison signal COMX. When the logical level of the comparison signal COMX is L level, namely, when the comparison circuit 21 detects the non-coincidence, the control signal generator 25 generates a one-shot pulse such that the logical level is H level for a predetermined short period as for the control signals UP2, CL1, and maintains the logical level L as for the control signals UP1, CL2. And, when the logical level of the comparison signal COMX is H level, namely, when the comparison circuit 21 detects the coincidence, the control signal generator 25 generates the one-shot pulse such that the logical level is H level for a predetermined short period as for the control signals UP1, CL2, and maintains the logical level L as for the control signals UP2, CL1.

The control signals UP1, CL1 are inputted to the counter 50, and the control signals UP2, CL2 are inputted to the counter 60. When the one-shot pulse as the control signal UP1 is inputted to the counter 50, the counter 50 makes 1 count-up. And, when the one-shot pulse as the control signal CL1 is inputted to the counter 50, the counter 50 resets the count number to "0". In other words, the control signal UP1 possesses a function as the count signal that instructs the counter 50 to count, and the control signal CL1 possesses a function as the clear signal that instructs the counter 50 to clear the count number.

In the same manner, when the one-shot pulse as the control signal UP2 is inputted to the counter 60, the counter 60 makes 1 count-up. And, when the one-shot pulse as the control signal CL2 is inputted to the counter 60, the counter 60 resets the count number to "0". In other words, the control signal UP2 possesses a function as the count signal that instructs the counter 60 to count, and the control signal CL2 possesses a function as the clear signal that instructs the counter 60 to clear the count number.

Further, in the so-called detection period of the initial synchronizing information, when the comparison circuit 21 detects the initial synchronizing information from the transmission data ES continuously transmitted as the output signal OUT1 in the form of a bit stream, immediately after the device incorporating the frame synchronous circuit 100 is powered, or after the channel of a broadcasting program is switched, the logical level of the comparison signal COMX becomes H level, however in this period, the control signal generator 25 is made not to generate the one-shot pulse as the control signals UP1, CL2. This may be arranged such that, after the initial synchronizing information is detected, a CPU (central processing unit), for example, generates a signal in response to the foregoing detection, and this signal makes the control signal generator 25 active. In other words, the counters 50, 60 count the comparison results by the comparison circuit 21 in which the detection of the initial synchronizing information is completed. Further, it may be arranged that the count number of the counter 50 is increased by at least 1 count without using the signal from the CPU, etc., or as mentioned above, the active state of the counter 50 is controlled by the signal from the CPU in the same manner as the control signal generator 25.

As in the above, immediately after the device incorporating the frame synchronous circuit 100 is powered, or after the channel of a broadcasting program is switched, the synchronizing information comparison unit 20 detects the initial synchronizing information from the transmission data ES continuously transmitted as the output signal OUT1 in the form of a bit stream; after the initial synchronizing information is detected, it compares the synchronizing information of the transmission data intermittently inputted thereto and the information held in the register 27; and in accordance with the comparison result, it generates the control signals UP1, CL1, UP2, CL2. Further, the synchronizing information comparison unit 20 controls to output the output signal OUT1 as the output signal OUT2 in accordance with the comparison signal COMX of the comparison circuit 21.

The counter 50 is a m-bit counter (here, m:positive integer), and the counter 60 is a n-bit counter (here, n:positive integer). Therefore, the counter 50 outputs one one-shot pulse as the signal FN1 every $2^m$ count. The counter 60 outputs one one-shot pulse as the signal FN2 every $2^n$ count.

Further, the control signal generator 25 generates the one-shot pulse as the control signal UP1 and the control signal CL2, and the one-shot pulse as the control signal UP2 and the control signal CL1. Therefore, the counter 50 outputs the one-shot pulse as the signal FN1 when receiving the one-shot pulse as the control signal UL continuously for $2^m$ times, and the counter 60 outputs the one-sho pulse as the signal FN2 when receiving the one-shot pulse as the control signal UP2 continuously for $2^n$ times.

As in the above, the synchronization setup circuit 101 as a whole detects the synchronizing information of the transmission data ES inputted in the form of a bit stream; on the basis of the frame length information LX from the header analysis circuit 103 described later which has been determined on the basis of the first detected synchronizing information, it compares the information equivalent to the synchronizing information to the subsequent transmission data in the bit stream and the normal synchronizing information at every frame length information LX; and it detects the coincidence. As a result of this coincidence detection, when the coincidence is detected continuously with a predetermined number of times (count number with which the counter 50 overflows), the coincidence of the synchronizing information is regularly detected thereafter, and the transmission data ES inputted to the synchronization setup circuit 101 in the form of a bit stream is continuously outputted as it is, as the output signal OUT 2. And as a result of the coincidence detection, when the non-coincidence is detected continuously with a predetermined number of times (count number with which the counter 60 overflows), taking a value in which the random number S is added to the frame length information LX as a modified frame length information, the synchronization setup circuit 101 compares the information equivalent to the synchronizing information to the subsequent transmission data in the bit stream and the normal synchronizing information again at every modified frame length information to detect the coincidence. Further, in order to set up a still more accurate synchronization, it may be arranged that the transmission data ES inputted to the synchronization setup circuit 101 in the form of a bit stream is outputted as the output signal OUT2, when the detection of the coincidence with a continuously predetermined number of times is made for plural times.

The output signal OUT2 of the synchronization setup circuit 101 is inputted to the header analysis circuit 103. The header analysis circuit 103 comprises a header analysis unit 30 and a frame length information calculation unit 40.

The header analysis unit 30 analyzes the header part of the transmission data ES inputted as the output signal OUT2. Of the information that the header analysis unit 30 analyzed, the header analysis unit 30 sends out an information INF of the sampling number of times and bit rate of the transmission data ES to the frame length information calculation unit 40. The header analysis unit 30 outputs a coded data part of the transmission data transmitted as the output signal OUT2 as the output signal OUT3. Further, the header analysis unit 30 outputs a synchronizing signal JX indicating the output timing of a decoded data described later, on the basis of the information included in the analyzed header.

The frame length information calculation unit 40 calculates, on the basis of the information INF sent from the header analysis unit 30, the frame length information LX of the transmission data ES which the header including the information INF belongs to, and outputs the result. That is, the frame length information calculation unit 40 possesses a function as a frame length determination unit.

The header analysis circuit 103 as a whole analyzes the header equivalent of the transmission data ES which the synchronizing information is detected from, outputs the coded data part of the transmission data ES which the analyzed header belongs to as the output signal OUT3, and outputs to determine the frame length information LX of the transmission data ES which the analyzed header belongs to.

The operation of the frame synchronous circuit 100 constructed as above will now be described.

Figure 4:
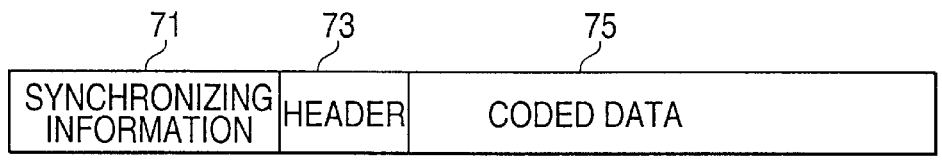
FIG. 4 is a chart to illustrate the construction of a transmission data.

Before describing the operation of the frame synchronous circuit 100, the construction of the transmission data ES transmitted continuously in the form of a bit stream and the construction of the whole decoder incorporating the frame synchronous circuit 100 will be described. FIG. 4 is a chart to illustrate the construction of the transmission data ES, and FIG. 5 is a block diagram of the decoder.

In FIG. 4, the transmission data ES includes a synchronizing information 71 allocated at the leading part, a header 73 allocated directly after the synchronizing information 71, and a coded data 75 allocated directly after the header 73. The transmission data ES with these data thus allocated is transmitted continuously to form a bit stream. That is, directly after the coded data 75 of one transmission data ES is allocated another transmission data ES with the synchronizing information 71 at the leading part.

Figure 5:
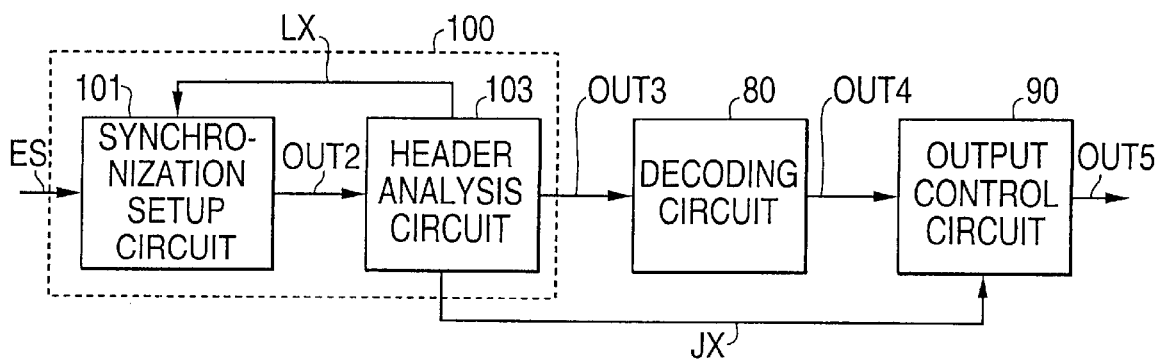
FIG. 5 is a block diagram of a decoder in which the frame synchronous circuit 100 in the first embodiment of the invention is incorporated.

In FIG. 5, the output signal OUT3 of the foregoing frame synchronous circuit 100 is inputted to a decoding circuit 80. The decoding circuit 80 decodes the coded data of the transmission data ES transmitted as the output signal OUT3. The decoded data is outputted as an output signal OUT4. The output signal OUT4 is inputted to an output control circuit 90. The output control circuit 90 outputs the decoded data at the timing in accordance with the synchronizing signal JX transmitted from the header analysis circuit 103. The decoder thus constructed decodes the transmission data ES and outputs the result.

FIG. 6 is a flow chart to illustrate the operation of the whole decoder as above. As shown in FIG. 6, immediately after this decoder or the device incorporating this decoder has been powered, or after the channel of a broadcasting program has been switched, when the transmission data ES is transmitted, the decoder starts the operation (step S0).

After starting the operation, the synchronization setup circuit 101 sets up a synchronization (step S1). After setting up the synchronization, the header of the transmission data ES is analyzed (step S2), and thereafter the coded data is decoded (step S3). In FIG. 6, the decoder is assumed to be incorporated in an audio equipment, and "decode audio" is put on the chart. The decoded data is subjected to the outputcontrol to be outputted (step S4).

FIG. 6 illustrates the operation flow of one transmission data ES after the synchronization is completed, and the end of the operation (step S5) follows the output control. In practice, the coded data of continuous transmission data are decoded, and after the synchronization is set up at step S1, the operation from step S2 through step S4 is repeated as to each of the transmission data ES.

The frame synchronous circuit 100 of this invention is used to carry out the synchronization setup. The operation of this frame synchronous circuit 100 will be described in detail. FIG. 7 is a timing chart to explain the operation of the frame synchronous circuit 100, illustrating a case in which the synchronization is set up. Here in FIG. 7, the data indicated by the symbol A signifies the transmission data ES transmitted in the form of a bit stream, the wave form indicated by the symbol B signifies the control signal UP1 outputted from the synchronizing information comparison unit 20, the wave form indicated by the symbol C signifies the control signal UP2 outputted from the synchronizing information comparison unit 20, the data indicated by the symbol D signifies the count number of the counter 50, and the data indicated by the symbol E signifies the count number of the counter 60.

Further in FIG. 7, to simplify the description, it is assumed that both the contents to be held in the registers 16, 18 in FIG. 2 are 1, and the one-shot pulse is generated in the signals FN1, FN2 when both the counters 50, 60 count 3 counts.

In FIG. 7, suppose that the frame synchronous circuit 100 starts detecting the synchronizing information of the arrival transmission data ES at time t0, immediately after this decoder or the device incorporating this decoder is powered, or after the channel of a broadcasting program is switched. Because of the initial detection of the synchronizing information, the count values of the counters 50, 60 are both reset to "0". And, the stream counter 11 is non-active, the frame length information LX is "0", and the selecting circuit 15 selects "0" as well. Therefore, the frame synchronous circuit 100 executes the detection of an information equivalent to the synchronizing information sequentially from the bit at which the frame synchronous circuit 100 has started detecting the synchronizing information of the arrival transmission data ES at time t0.

After starting the detection of synchronizing information, a normal synchronizing information DX is detected, at time t1, by the synchronizing information comparison unit 20 as the synchronizing information. At this moment, the logical level of the comparison signal COMX becomes H level, and the header allocated directly after the synchronizing information DX is sent to the header analysis circuit 103 through the transmission gate 23. The header analysis circuit 103 calculates the frame length information LX. This calculation operation is illustrated by the sign "cal" in FIG. 7. The calculated frame length information LX is inputted to the synchronization setup circuit 101. The frame length information LX is illustrated by the sign L in FIG. 7. Because of the initial detection of the synchronizing information, the one-shot pulse is not generated in the control signal UP1, and the counter 50 maintains the count value "0".

After activating the stream counter 11 and counting the frame length information LX=L, the synchronization setup circuit 101 sends the transmission data ES again to the synchronizing information comparison unit 20. The synchronizing information comparison unit 20 executes the comparison of a synchronizing information relating to a newly arrival transmission data ES. In the bit stream, the comparison of the synchronizing information is executed at the position of the bit of the synchronizing information equivalent from the bit transmitted in delay for the frame length information LX=L. In FIG. 7, since the normal synchronizing information DX is detected, the frame length information is also based on the normal header. Therefore, the synchronizing information comparison unit 20 executes the comparison of the normal synchronizing information DX relating to a newly arrival transmission data ES.

Thus, at time t2, the normal synchronizing information DX is compared again with the information held in the register 27 by the synchronizing information comparison unit 20. The synchronizing information comparison unit 20 detects the coincidence, and brings the logical level of the comparison signal COMX into H level. Accordingly, the header allocated directly after the normal synchronizing information DX is transmitted to the header analysis circuit 103 through the transmission gate 23. The header analysis circuit 103 calculates the frame length information LX. At this moment, since the control signal UP1 has the one-shot pulse generated in accordance with the logical level of the comparison signal COMX, the count value of the counter 50 becomes "1". And, since the control signal CL2 has the one-shot pulse generated, the counter 60 is reset. In order to simplify the description of the operation, it is assumed in this embodiment that the control signal CL1 resets the counter 50 when the control signal UP2 has the one-shot pulse generated, and the control signal CL2 resets the counter 60 when the control signal UP1 has the one-shot pulse generated; and the description thereof will be omitted.

Thereafter, on the basis of the frame length information LX=L calculated afresh, the transmission data ES is sent again to the synchronizing information comparison unit 20 from the bit part. transmitted in delay for this frame length information. The synchronizing information comparison unit 20 executes the comparison of a synchronizing information relating to a newly arrival transmission data ES.

At time t3, the normal synchronizing information DX is compared again with the information held in the register 27 by the synchronizing information comparison unit 20. The synchronizing information comparison unit 20 detects the coincidence, and brings the logical level of the comparison signal COMX into H level. Accordingly, the header allocated directly after the normal synchronizing information DX is transmitted to the header analysis circuit 103 through the transmission gate 23. The header analysis circuit 103 again calculates the frame length information LX. At this moment, since the control signal UP1 has the one-shot pulse generated in accordance with the logical level of the comparison signal COMX, the count value of the counter 50 becomes "2".

Thereafter, on the basis of the frame length information LX=L calculated afresh, the transmission data ES is sent again to the synchronizing information comparison unit 20 from the bit part transmitted in delay for this frame length information. The synchronizing information comparison unit 20 executes the comparison of a synchronizing information relating to a newly arrival transmission data ES.

At time t4, the normal synchronizing information DX is compared again with the information held in the register 27 by the synchronizing information comparison unit 20. The synchronizing information comparison unit 20 detects the coincidence, and brings the logical level of the comparison signal COMX into H level. Accordingly, the header allocated directly after the normal synchronizing information DX is transmitted to the header analysis circuit 103 through the transmission gate 23. The header analysis circuit 103 again calculates the frame length information LX. At this moment, since the control signal UP1 has the one-shot pulse generated in accordance with the logical level of the comparison signal COMX, the count value of the counter 50 becomes "3".

Since the counter 50 has the count value "3", the counter 50 outputs the one-shot pulse as the signal FN1 indicating the overflow. The counter 118 makes 1 count in accordance with the signal FN1. As a result, the content in the register 18 is coincident with the content in the counter 118, and the comparison circuit 19 outputs the comparison signal COM1 of the logical level H. Accordingly, the transmission gate 14 is made active, and the input transmission data ES is sent out to the header analysis circuit 103 on the subsequent stage. Thus, the synchronization is set up.

After the synchronizing information is detected at time t4, the header analysis circuit 103 analyzes the header part, and the decoding circuit 80 decodes the coded data. In FIG. 7, the start of these operations is illustrated by "dec".

Thereafter, the comparison operation of the synchronizing information is continued in the same manner, and the comparison of the synchronizing information is executed to an appropriate bit part of the bit stream on the basis of the normal frame length information. Therefore, at time t5, for example, the normal synchronizing information of a new transmission data ES is compared with the information held in the register 27. Accordingly, the synchronization setup state is maintained. And, after the synchronization is set up, if the content held in the counter 118 is maintained until a restart of the decoder or the device incorporating the decoder, a new power input thereof, or a channel switching of a broadcasting program is conducted, the synchronization setup state can be maintained in the same manner.

Figure 8:
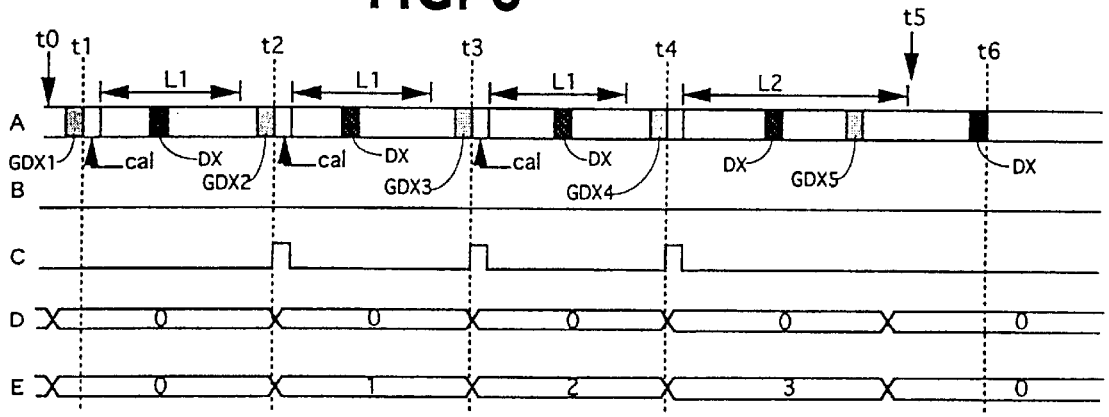
FIG. 8 is a timing chart to explain the operation of the frame synchronous circuit 100 in the first embodiment of the invention, and the timing chart illustrates a case when the synchronization is lost.

Next, the operation of the frame synchronous circuit 100 when a pseudo synchronizing information is detected will now be described. FIG. 8 is a timing chart to explain the operation of the frame synchronous circuit 100, which illustrates a case when the synchronization is lost. The premises in FIG. 8 remain the same as in FIG. 7.

In FIG. 8, in the same manner as in FIG. 7, suppose that the frame synchronous circuit 100 starts detecting the synchronizing information of the arrival transmission data ES at time t0, immediately after this decoder or the device incorporating this decoder is powered, or after the channel of a broadcasting program is switched. Because of the initial detection of the synchronizing information, the count values of the counters 50, 60 are both reset to "0". And, the stream counter 11 is non-active, the frame length information LX is "0", and the selecting circuit 15 selects "0" as well. Therefore, the frame synchronous circuit 100 executes the detection of an information equivalent to the synchronizing information sequentially from the bit at which the frame synchronous circuit 100 has started detecting the synchronizing information of the arrival transmission data ES at time t0.

After starting the detection of synchronizing information, at time t1, the synchronizing information comparison unit 20 detects, as the synchronizing information, a pseudo synchronizing information GDX1 which is not a normal synchronizing information, but an information as having the same or similar contents as a synchronizing information contained, for example, in the coded data. At this moment, the logical level of the comparison signal COMX becomes H level, and the header allocated directly after the pseudo synchronizing information GDX1 is sent to the header analysis circuit 103 through the transmission gate 23. The header analysis circuit 103 calculates the frame length information LX. This calculation operation is illustrated by the sign "cal" in FIG. 8. The calculated frame length information LX is inputted to the synchronization setup circuit 101. The frame length information LX is illustrated by the sign L1 in FIG. 8. Because of the initial detection of the synchronizing information, the one-shot pulse is not generated in the control signal UP1, and the counter 50 maintains the count value "0".

Since the information detected as the synchronizing information is the pseudo synchronizing information GDX1, the header analyzed by the header analysis circuit 103 is a bit information of the header equivalent directly after the pseudo synchronizing information GDX1. Thus, the header analysis circuit 103 is to analyze the header on the basis of the information not being the normal header. As a result, the frame length information L1 (=LX) determined by the header analysis circuit 103 differs from the normal frame length information (for example, becomes shorter than the normal frame length information).

After activating the stream counter 11 and counting the frame length information LX=L1, the synchronization setup circuit 101 sends the transmission data ES again to the synchronizing information comparison unit 20. The synchronizing information comparison unit 20 executes the comparison of a synchronizing information relating to a newly arrival transmission data ES. In the bit stream, the comparison of the synchronizing information is executed at the position of the bit of the synchronizing information equivalent from the bit transmitted in delay for the frame length information LX=L1. In FIG. 8, since the pseudo synchronizing information GDX1 is detected, the frame length information is also based on an information not being the normal header. Therefore, leaping over the normal synchronizing information DX, the synchronizing information comparison unit 20 is to execute the comparison of a pseudo synchronizing information GDX2 relating to a newly arrival transmission data ES. As mentioned above, since the frame length information is not the normal one, the pseudo synchronizing information GDX2 relating to the new transmission data ES is located at a position different from that of the pseudo synchronizing information GDX1 of the transmission data ES from which the pseudo synchronizing information GDX1 is previously detected.

Thus, at time t2, a new pseudo synchronizing information GDX2 (an information different from the pseudo synchronizing information GDX1 previously detected, different from the pseudo synchronizing information) as a synchronizing information is compared with the information held in the register 27 by the synchronizing information comparison unit 20. In this case, the synchronizing information comparison unit 20 detects the non-coincidence, and the comparison signal COMX maintains the logical level L; and therefore, the transmission gate 23 maintains the non-active state. Accordingly, the information allocated directly after the pseudo synchronizing information GDX cannot be transmitted to the header analysis circuit 103 through the transmission gate 23. The header analysis circuit 103 maintains the output of the frame length information L1 (=LX) previously calculated, since it is not supplied with a new header equivalent information. At this moment, since the control signal UP2 has the one-shot pulse generated in accordance with that the logical level of the comparison signal COMX is L level although the comparison processing is made, the count value of the counter 60 becomes "1".

Thereafter, on the basis of the frame length information L1 (=LX) previously calculated, the transmission data ES is sent again to the synchronizing information comparison unit 20 from the bit part transmitted in delay for this frame length information. The synchronizing information comparison unit 20 executes the comparison of a synchronizing information relating to a newly arrival transmission data ES.

At time t3, leaping over the normal synchronizing information, a pseudo synchronizing information GDX3 as a synchronizing information is compared with the information held in the register 27 by the synchronizing information comparison unit 20. This pseudo synchronizing information GDX3 is located, in the same manner as the pseudo synchronizing information GDX2, at a position different from that of the pseudo synchronizing information GDX1 of the transmission data ES in which the pseudo synchronizing information GDX1 is previously detected. Accordingly, the synchronizing information comparison unit 20 detects the non-coincidence, and the comparison signal CON maintains the logical level L. In consequence, the information allocated directly after the pseudo synchronizing information GDX3 cannot be transmitted to the header analysis circuit 103 through the transmission gate 23. Accordingly, the header analysis circuit 103 maintains the output of the frame length information L1 (=LX) previously calculated. At this moment, since the control signal UP2 has the one-shot pulse generated in accordance with the logical level of the comparison signal COMX, the count value of the counter 60 becomes "2".

Thereafter, on the basis of the frame length information L1 (=LX), the transmission data ES is sent again to the synchronizing information comparison unit 20 from the bit part transmitted in delay for this frame length information. The synchronizing information comparison unit 20 executes the comparison of a synchronizing information relating to a newly arrival transmission data ES.

At time t4, a new pseudo synchronizing information GDX4 as a synchronizing information is compared with the information held in the register 27 by the synchronizing information comparison unit 20. Since the synchronizing information comparison unit 20 detects the non-coincidence, the comparison signal COMX maintains the logical level L. Accordingly, the information allocated directly after the synchronizing information DX cannot be transmitted to the header analysis circuit 103 through the transmission gate 23. The header analysis circuit 103 maintains the output of the frame length information L1 previously calculated. At this moment, since the control signal UP2 has the one-shot pulse generated in accordance with the logical level of the comparison signal COMX, the count value of the counter 60 becomes "3".

Since the counter 60 has the count value "3", the counter 60 outputs the one-shot pulse as the signal FN2 indicating the overflow. The counter 116 makes 1 count in accordance with the signal FN2. As a result, the content in the register 16 is coincident with the content in the counter 116, and the comparison circuit 17 outputs the comparison signal COM2 of the logical level H.

The selecting circuit 15 outputs the random number S as the output information SX, in accordance with the logical level H of the comparison signal COMP2. The arithmetic operation unit 12 adds the output information SX and the frame length information L1 (=LX) to generate a new frame length information, and outputs it as the output information LS.

This new frame length information is indicated by the sign L2 in FIG. 8. The new frame length information L2 is made longer than the previously calculated frame length information L1 by a number that the random number S presents. The comparison circuit 13 is to compare the count number of the stream counter 11 with the new frame length information L2.

Thereafter, on the basis of the frame length information L2 (=LX), the transmission data ES is sent to the synchronizing information comparison unit 20 from the bit part transmitted in delay for this frame length information. The synchronizing information comparison unit 20 executes the detection of a synchronizing information from a newly arrival transmission data ES. Since it has compared the pseudo synchronizing information continuously for three times, the synchronizing information comparison unit 20 is to detect a synchronizing information from a new transmission data ES, again in the same manner as the case of time t0.

Since the frame length information L2 is longer than the frame length information L1 previously calculated, a synchronizing information is to be detected at time t5 from the bit position leaping a new pseudo synchronizing information GDX5. Therefore, at time t6, the normal synchronizing information DX is to be detected by the synchronizing information comparison unit 20. Thereafter, the synchronization is set up by the same operation as the one after time t1 in FIG. 7.

As above, even though the frame synchronous circuit 100 of this invention detects a pseudo synchronizing information, the frame synchronous circuit 100 confirms that it has detected the pseudo synchronizing information in a short time, and varies the frame length information; which makes it possible to detect the pseudo synchronizing information in an early stage.

Further, even though a pseudo synchronizing information is detected first, or one and the same pseudo synchronizing information is repeatedly allocated in each of the transmission data ES transmitted in the form of a bit stream, if the normal synchronizing information is detected within a predetermined number of times (for example, a number of times for which the counter 60 outputs the one-shot pulse as the signal FN2), the control signal CL2 resets the count number of the counter 60 to send the normal header information to the header analysis circuit 103; and thereby the header analysis circuit 103 will be able to enter the comparison operation of the synchronizing information by the normal frame length information.

Further, even though one and the same pseudo synchronizing information is repeatedly allocated in each of the transmission data ES transmitted in the form of a bit stream, and a number of pseudo synchronizing information exceeding the predetermined number of times (for example, a number of times for which the counter 60 outputs the one-shot pulse as the signal FN2) are contained in each of the transmission data ES transmitted in the form of a bit stream, the pseudo synchronizing information can be detected in an early stage by varying the frame length information.

Furthermore, as illustrated in FIG. 2 and FIG. 3, the frame synchronous circuit 100 does not include a specially added circuit, and restricts a large increase in the circuit scale to the utmost as the construction for implementing the invention.

Figure 9:
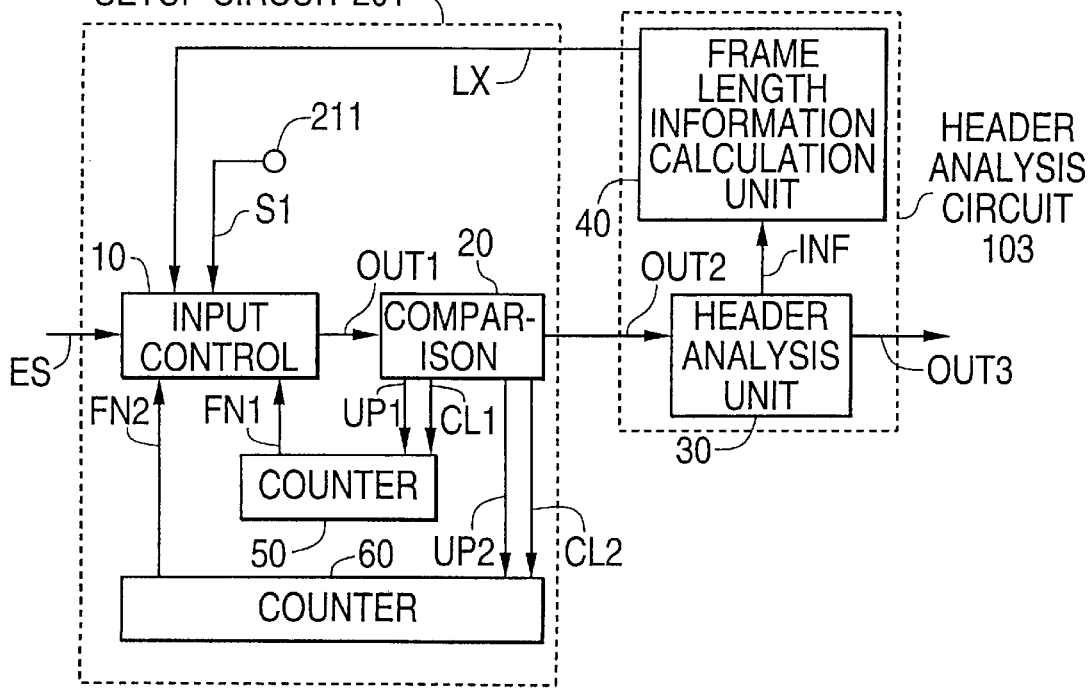
FIG. 9 is a circuit diagram of a frame synchronous circuit 200 in the second embodiment of the invention.

Next, the frame synchronous circuit in the second embodiment of this invention will be described with the accompanying drawings. FIG. 9 is a circuit diagram of a frame synchronous circuit 200 in the second embodiment of this invention. Here in FIG. 9, the same components as in FIG. 1 are given the same symbols, and the description will be omitted.

In FIG. 9, a synchronization setup circuit 201 is provided with a terminal 211, instead of the random number generator 111 in FIG. 1. The other components in FIG. 9 are the same as in FIG. 1.

The terminal 211 may be used as a terminal connected to a constant generator that outputs a desired constant in the frame synchronous circuit 200 or in a decoder incorporating the frame synchronous circuit 200, or it may be used as an outer terminal that makes it possible to input the constant from outside of the decoder. That is, the terminal 211 is a terminal to which a constant S1 (here, S1 is a positive integer) is inputted. The terminal 211 is connected as one input of the selecting circuit 15, instead of the random number S in FIG. 2.

To take the random number S in the first embodiment for the constant S1, the operation of the frame synchronous circuit 200 in the second embodiment will be the same as that of the frame synchronous circuit 100 in the first embodiment. Therefore, the frame synchronous circuit 200 in the second embodiment is able to achieve the same effect as the frame synchronous circuit 100 in the first embodiment.

And, the second embodiment needs the terminal 211, and does not need the random number generator 111. Further, if the constant generator is provided in the frame synchronous circuit 200, the constant generator is smaller in the circuit scale than the random number generator. Accordingly, the frame synchronous circuit 200 in the second embodiment can be made smaller in the circuit scale than the frame synchronous circuit. 100 in the first embodiment, which contributes to downsizing the whole decoder. And, the circuit scale can be made smaller to reduce the cost.

Further, in the second embodiment, in case that the constant generator is provided in the frame synchronous circuit 200 or the decoder, the constant that the constant generator outputs may be a fixed one, or a variable one that can be set arbitrarily. In the former case, since the construction to vary the constant is not needed, and the circuit scale can be made still smaller. In the latter case, the capability of arbitrarily varying the constant will give a still better usability.

Figure 10:
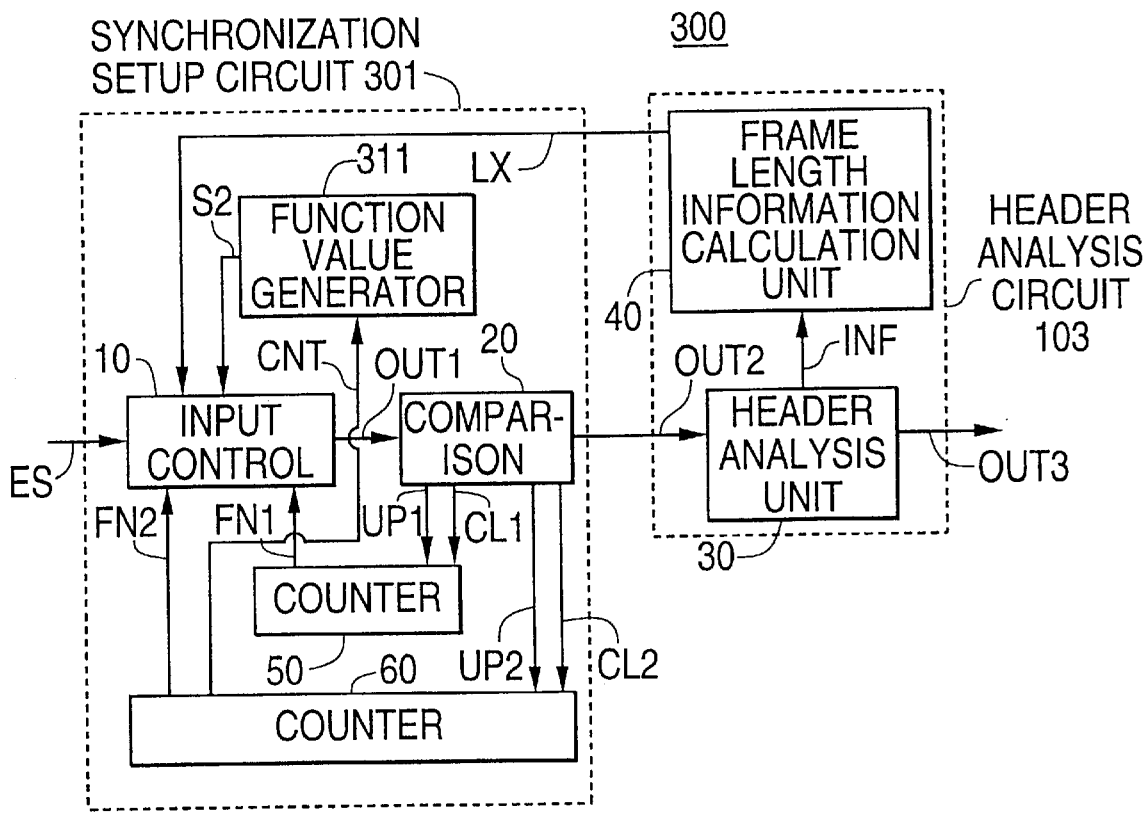
FIG. 10 is a circuit diagram of a frame synchronous circuit 300 in the third embodiment of the invention.

Next, the frame synchronous circuit in the third embodiment of this invention will be described with the accompanying drawings. FIG. 10 is a circuit diagram of a frame synchronous circuit 300 in the third embodiment of this invention. Here in FIG. 10, the same components as in FIG. 1 are given the same symbols, and the description will be omitted.

In FIG. 10, a synchronization setup circuit 301 is provided with a function value generator 311, instead of the random number generator 111. And, the function value generator 311 contains the count number CNT of the counter 60. The other components in FIG. 10 are the same as in FIG. 1.

Figure 11:
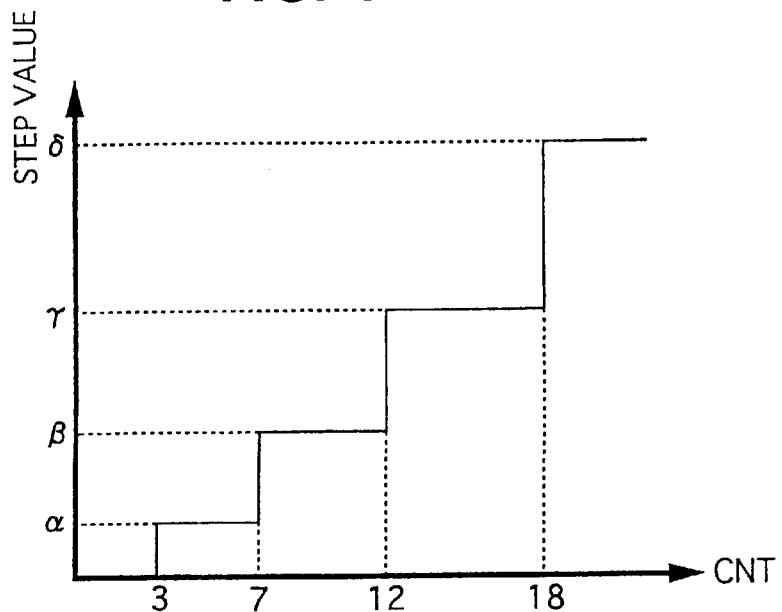
FIG. 11 is a graph to explain an information outputted by a function value output circuit 311 in the third embodiment of the invention.

The information that the function value generator 311 outputs will hereunder be described. FIG. 11 is a graph to explain the information that the function value generator 311 outputs. In FIG. 11, the axis of ordinate indicates a number (step number) that the function value generator 311 outputs, and the axis of abscissas indicates the count number CNT of the counter 60. The counter 60 in the first and the second embodiment has been described as the counter to make 3 counts; however, FIG. 11 illustrates a case that the counter 60 makes 32 counts, in order to facilitate to understand the function value generator 311 in the third embodiment.

As shown in FIG. 11, when the count number CNT of the counter 60 becomes 3 (CNT=3), the function value generator 311 outputs a (here, a: positive integer) as the output information S2. When the count number CNT of the counter 60 becomes 7 (CNT=7), the function value generator 311 outputs b (here, b: positive integer, b>a) as the output information S2. When the count number CNT of the counter 60 becomes 12 (CNT=12), the function value generator 311 outputs g (here, g: positive integer, g>b) as the output information S2. When the count number CNT of the counter 60 becomes 18 (CNT=18), the function value generator 311 outputs d (here, d: positive integer, d>g) as the output information S2. In this manner, the function value generator 311 outputs the information S2 of a number corresponding to a count value, in correspondence with a predetermined count number. That is, the function value generator 311 outputs a step function value corresponding to the count number of the counter 60.

As shown in FIG. 11, the step values a~d are discontinuous numbers (for example, a=4, b=8, g=14, d=20). The step values a~d can be continuous numbers (for example, a=4, b=5, g=6, d=7). However, the step values are used for varying the frame length information, as described later, and it is more effective that the step values a~d take on discontinuous numbers in order to obtain a significance in varying the frame length information.

As shown in FIG. 11, the step value is varied by each of the discontinuous numbers of the count number CNT, however the step value may be varied by each of the continuous numbers of the count value. In the former case, since the step value is varied by each of the discontinuous numbers, a new frame length information is not needed to be calculated at each time when the continuous count numbers CNT are outputted; and a still faster operation can be expected.

The information S2 of the function value generator 311 that outputs the information S2 as shown in FIG. 11 is one input to the selecting circuit 15, instead of the random number S in FIG. 2. That is, the function value generator 311 outputs an additional value that is used for varying the frame length information.

To take the random number S in the first embodiment for the function value S2, the operation of the frame synchronous circuit 300 in the third embodiment will be the same as that of the frame synchronous circuit 100 in the first embodiment. Here, in the frame synchronous circuit 300 in the third embodiment, the counter 60 is designed to make 32 counts. Accordingly, to achieve the same operation as in the first embodiment, it is necessary to output the one-shot pulse every 3 counts as the signal FN2. This can be achieved by constituting the counter 60 with a counter that makes 32 counts in accordance with the control signal UP2 and a counter that makes 3 counts in accordance with the control signal UP2. When the counter 60 is formed in this manner, it is needed to be arranged that the counter that makes 32 counts outputs the count number CNT, and the counter that makes 3 counts outputs the signal FN2.

In the operation to set up the synchronization in the frame synchronous circuit 300 of the third embodiment, when the first one-shot pulse is outputted as the signal FN2, the information S2 selected by the selecting circuit 15 becomes a (S2=a). In the same operation to set up the synchronization, when the second one-shot pulse is outputted as the signal FN2, the information S2 selected by the selecting circuit 15 becomes a again (S2=a). In the same operation to set up the synchronization, when the third one-shot pulse is outputted as the signal FN2, the information S2 selected by the selecting circuit 15 becomes b. Thereafter, when the fourth, or fifth one-shot pulse is outputted as the signal FN2, the information S2 selected by the selecting circuit 15 becomes g (S2=g); and when the F-th one-shot pulse (here, F is a positive integer$\geq 6$) is outputted as the signal FN2, the information S2 selected by the selecting circuit 15 becomes d (S2=d).

Thus, the property of the information SX outputted from the selecting circuit 15 which is used for varying the frame length information is not equal, however the frame synchronous circuit 300 in the third embodiment can obtain the same effect as the frame synchronous circuit 100 in the first embodiment.

Further, in the frame synchronous circuit 300 in the third embodiment, the signal FN2 may be inputted to the function value generator 311 instead of the count number CNT. In this case, it is needed to be arranged that when the first or the second one-shot pulse is outputted as the signal FN2, the function value generator 311 outputs a as the information S2; when the third one-shot pulse is outputted as the signal FN2, the function value generator 311 outputs b as the information S2; when the fourth or the fifth one-shot pulse is outputted as the signal FN2, the function value generator 311 outputs g as the information S2; and when the F-th one-shot pulse is outputted as the signal FN2, the function value generator 311 outputs d as the information S2. With such a construction, the frame synchronous circuit 300 in the third embodiment can achieve the same effect as the frame synchronous circuit 100 in the first embodiment, without changing the construction of the counter 60.

In this manner, the frame synchronous circuit 300 in the third embodiment is able to securely increase the number to add in varying the frame length information without using the random number or the constant, and a still faster synchronization setup can be expected.

Incidentally, the function value generator 311 can easily be made up with, for example, a memory from which data (step values) in which the count numbers CNT are recorded as addresses can be read out. And, since the arithmetic operation processing as needed in the random number generator 111 is unnecessary, the frame synchronous circuit 300 in the third embodiment is able to make the circuit scale smaller than the frame synchronous circuit 100 in the first embodiment.

Figure 12:
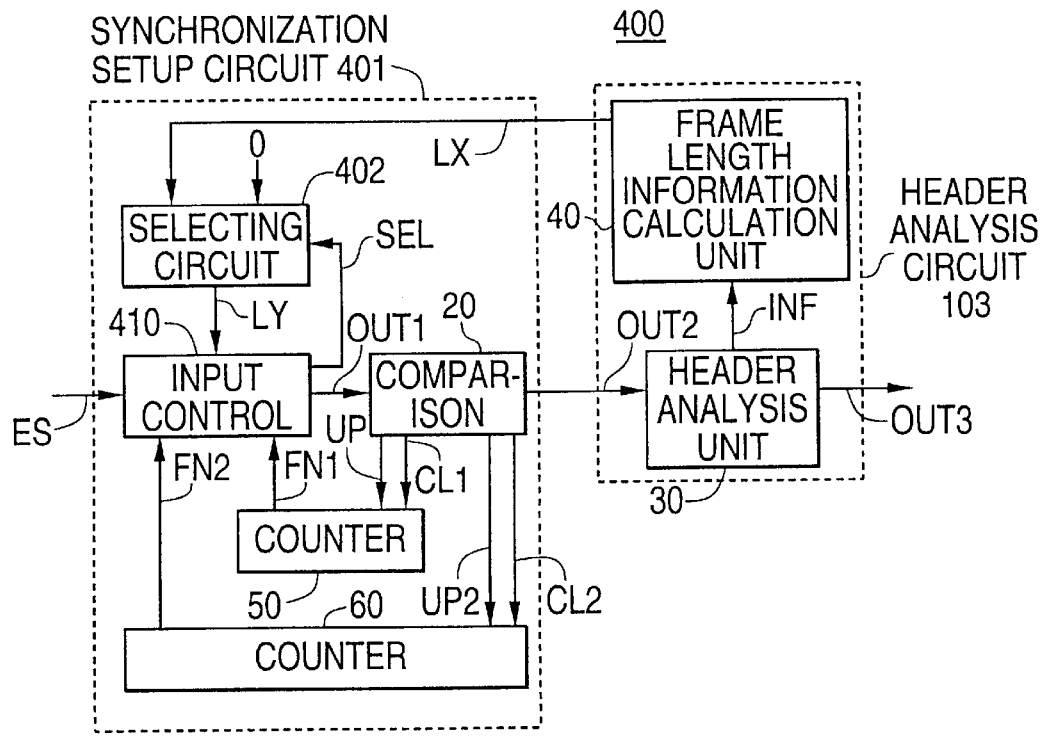
FIG. 12 is a circuit diagram of a frame synchronous circuit 400 in the fourth embodiment of the invention.

Next, the frame synchronous circuit in the fourth embodiment of this invention will be described with the accompanying drawings. FIG. 12 is a circuit diagram of a frame synchronous circuit 400 in the fourth embodiment of this invention. Here in FIG. 12, the same components as in FIG. 1 are given the same symbols, and the description will be omitted.

In FIG. 12, a selecting circuit 402 is added to a synchronizing setup circuit 401, and the input control unit 10 is replaced by an input control unit 410. The other components in FIG. 12 are the same as in FIG. 1.

The selection circuit 402 receives the frame length information LX and the data having the information of "0". The selection circuit 402 selectively outputs the frame length information LX or the data having the information of "0" as an output information LY, in accordance with the logical level of a selecting signal SEL outputted from the input control unit 410. When the selecting signal SEL is in L level the frame length information LX is selected; and when the selecting signal SEL is in H level, the data "0" is selected.

Figure 13:
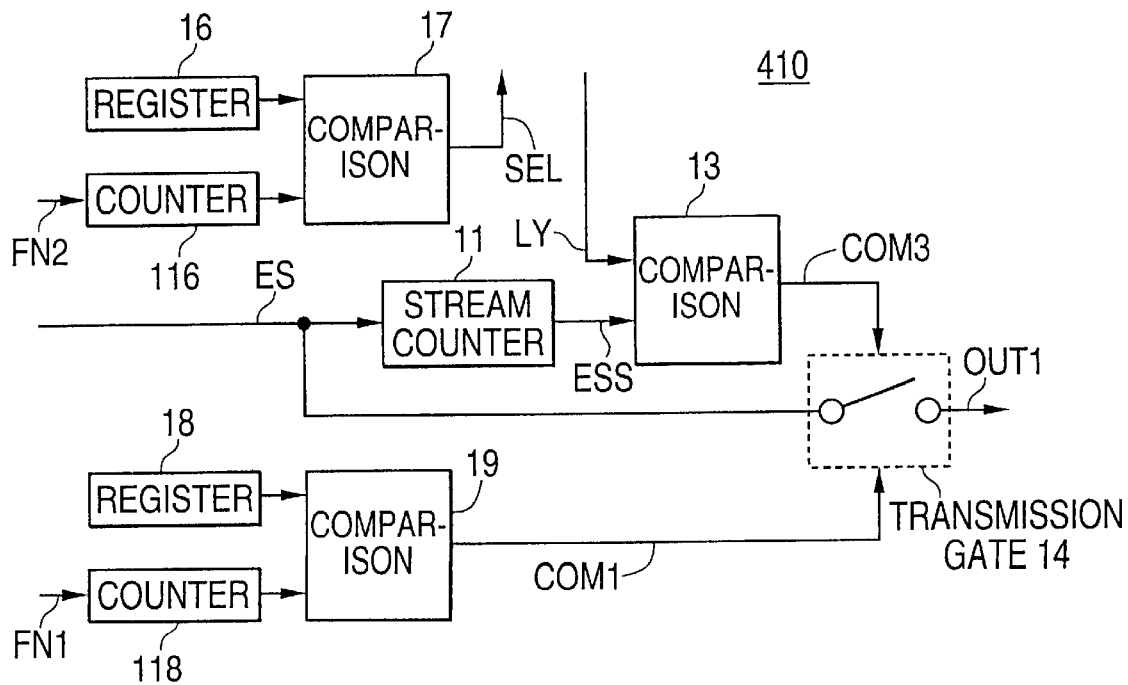
FIG. 13 is a circuit diagram of an input controller 410 in the fourth embodiment of the invention.

FIG. 13 illustrates a circuit diagram of the input control unit 410. In FIG. 13, the same components as in FIG. 2 are given the same symbols, and the description thereof will be omitted.

In FIG. 13, the arithmetic operation unit 12 and the selecting circuit 15 are eliminated. Accordingly, in replacement for the output information LS of the arithmetic operation unit 12, the output information LY of the selecting circuit 402 is directly inputted to the comparison circuit 13. And, the comparison signal COM2 of the comparison circuit 17 in FIG. 2 is used as the selecting signal SEL.

The operation of the frame synchronous circuit 400 constructed as above will hereunder be described. Here, in the initial state to start detecting the synchronizing information immediately after the device incorporating the frame synchronous circuit 400 is powered, or after the channel of a broadcasting program is switched, the selecting signal SEL is in L level. This is the same as the comparison signal COM2 in the frame synchronous circuit 100 of the first embodiment. Accordingly, the selecting circuit 402 outputs the frame length information LX as the output information LY. And, in the initial state, the frame length information LX is reset to "0", and the stream counter 11 is non-active; and accordingly, the count number ESS of the stream counter is also "0". Consequently, the comparison circuit 13 detects the coincidence, and the comparison signal COM3 is in H level; and the transmission gate 14 is active.

Thus, the operation in the initial state is the same as in the first embodiment, and in the case where the synchronization as shown in FIG. 7 is set up, the operations of the arithmetic operation unit 12 and the selecting circuit 17 are not conducted. Therefore, as to the case where the synchronization is set up, the operation of the frame synchronous circuit 400 in the fourth embodiment is the same as that of the frame synchronous circuit 100 in the first embodiment, and the description will be omitted.

Therefore, the operation of the frame synchronous circuit 400 when a pseudo synchronizing information is detected will be described. FIG. 14 is a timing chart to explain the operation of the frame synchronous circuit 400, which illustrates a case when the synchronization is lost. Here, it is premised that, in the same manner as in FIG. 7, the information held in each of the registers 16, 18 is "1", and the counters 50, 60 each output the one-shot pulses as the signal FN1, FN2.

In FIG. 14, suppose that the frame synchronous circuit 400 starts detecting the synchronizing information of the arrival transmission data ES at time t0. Because of the initial detection of the synchronizing information, the count values of the counters 50, 60 are both reset to "0". And, the stream counter 11 is non-active, the frame length information LX is "0". And as above, since the transmission gate 14 is active, the frame synchronous circuit 400 executes the detection of an information equivalent to the synchronizing information sequentially from the bit at which the frame synchronous circuit 400 has started detecting the synchronizing information of the arrival transmission data ES at time t0.

After starting the detection of synchronizing information, at time t1, the synchronizing information comparison unit 20 detects, as the synchronizing information, a pseudo synchronizing information GDX1 which is not a normal synchronizing information, but an information as having the same or similar contents as a synchronizing information contained in the coded data. At this moment, the logical level of the comparison signal COMX becomes H level, and the header allocated directly after the pseudo synchronizing information GDX1 is sent to the header analysis circuit 103 through the transmission gate 23. The header analysis circuit 103 calculates the frame length information LX. This calculation operation is illustrated by the sign "cal" in FIG. 14. The calculated frame length information LX is inputted to the synchronization setup circuit 401. The frame length information LX is illustrated by the sign L1 in FIG. 14. Because of the initial detection of the synchronizing information, the one-shot pulse is not generated in the control signal UP1, and the counter 50 maintains the count value "0".

Since the information detected as the synchronizing information is the pseudo synchronizing information GDX1, the header analyzed by the header analysis circuit 103 is a bit information of the header equivalent directly after the pseudo synchronizing information GDX1. Thus, the header analysis circuit 103 is to analyze the header on the basis of the information not being the normal header. As a result, the frame length information L1 (=LX) determined by the header analysis circuit 103 differs from the normal frame length information (for example, becomes shorter than the normal frame length information). The frame length information L1 thus calculated is inputted to the comparison circuit 13, as the output information LY of the selecting circuit 402.

After activating the stream counter 11 and counting the frame length information LX=L1, the synchronization setup circuit 401 sends the transmission data ES again to the synchronizing information comparison unit 20. The synchronizing information comparison unit 20 executes the comparison of a synchronizing information relating to a newly arrival transmission data ES. In the bit stream, the comparison of the synchronizing information is executed at the position of the bit of the synchronizing information equivalent from the bit transmitted in delay for the frame length information LX=L1. In FIG. 14, since the pseudo synchronizing information GDX1 is detected, the frame length information is also based on an information not being the normal header. Therefore, leaping over the normal synchronizing information DX, the synchronizing information comparison unit 20 is to execute the comparison of a pseudo synchronizing information GDX2 relating to a newly arrival transmission data ES. As mentioned above, since the frame length information is not the normal one, the pseudo synchronizing information GDX2 relating to the new transmission data ES is located at a position different from that of the pseudo synchronizing information GDX1 of the transmission data ES in which the pseudo synchronizing information GDX1 is previously detected.

Thus, at time t2, a new pseudo synchronizing information GDX2 (an information different from the pseudo synchronizing information GDX1 previously detected, different from the pseudo synchronizing information) as a synchronizing information is compared with the information held in the register 27 by the synchronizing information comparison unit 20. In this case, the synchronizing information comparison unit 20 detects the non-coincidence, and the comparison signal COMX maintains the logical level L; and therefore, the transmission gate 23 maintains the non-active state. Accordingly, the information allocated directly after the pseudo synchronizing information GDX cannot be transmitted to the header analysis circuit 103 through the transmission gate 23. The header analysis circuit 103 maintains the output of the frame length information L1 (=LX) previously calculated, since it is not supplied with a new header equivalent information. At this moment, since the control signal UP2 has the one-shot pulse generated in accordance with that the logical level of the comparison signal COMX is L level although the comparison processing is made, the count value of the counter 60 becomes "1".

Thereafter, on the basis of the frame length information L1 (=LX) previously calculated, the transmission data ES is sent again to the synchronizing information comparison unit 20 from the bit part transmitted in delay for this frame length information. The synchronizing information comparison unit 20 executes the comparison of a synchronizing information relating to a newly arrival transmission data ES.

At time t3, leaping over the normal synchronizing information, a pseudo synchronizing information GDX3 as a synchronizing information is compared with the information held in the register 27 by the synchronizing information comparison unit 20. This pseudo synchronizing information GDX3 is located, in the same manner as the pseudo synchronizing information GDX2, at a position different from that, of the pseudo synchronizing information GDX1 of the transmission data ES in which the pseudo synchronizing information GDX1 is previously detected. Accordingly, the synchronizing information comparison unit 20 detects the non-coincidence, and the comparison signal CON maintains the logical level L. In consequence, the information allocated directly after the pseudo synchronizing information GDX3 cannot be transmitted to the header analysis circuit 103 through the transmission gate 23. Accordingly, the header analysis circuit 103 maintains the output of the frame length information L1 (=LX) previously calculated. At this moment, since the control signal UP2 has the one-shot pulse generated in accordance with the logical level of the comparison signal COMX, the count value of the counter 60 becomes "2".

Thereafter, on the basis of the frame length information L1 (=LX), the transmission data ES is sent again to the synchronizing information comparison unit 20 from the bit part transmitted in delay for this frame length information. The synchronizing information comparison unit 20 executes the comparison of a synchronizing information relating to a newly arrival transmission data ES.

At time t4, a new pseudo synchronizing information GDX4 as a synchronizing information is compared with the information held in the register 27 by the synchronizing information comparison unit 20. Since the synchronizing information comparison unit 20 detects the non-coincidence, the comparison signal COMX maintains the logical level L. Accordingly, the information allocated directly after the synchronizing information DX cannot be transmitted to the header analysis circuit 103 through the transmission gate 23. The header analysis circuit 103 maintains the output of the frame length information L1 previously calculated. At this moment, since the control signal UP2 has the one-shot pulse generated in accordance with the logical level of the comparison signal COMX, the count value of the counter 60 becomes "3".

Since the counter 60 has the count value "3", the counter 60 outputs the one-shot pulse as the signal FN2 indicating the overflow. The counter 116 makes 1 count in accordance with the signal FN2. As a result, the content in the register, 16 is coincident with the content in the counter 116, and the comparison circuit 17 outputs the selecting signal SEL of the logical level H.

The selecting circuit 402 outputs "0" as the output information, in accordance with a voltage level of the selecting signal SEL, which is the same as the frame length information LX=0. The comparison circuit 13 is to compare the count number of the stream counter 11 with this new frame length information (=0). Here, if the stream counter 11 is assumed to be non-active in accordance with H level of the selecting signal SEL, the comparison circuit 13 will always detect the coincidence. Accordingly, the comparison signal COM3 becomes H level, and the transmission gate 14 becomes active. That is, at this moment, the operation is brought into a state similar to the initial state at time t0.

Accordingly, a newly continuous transmission data ES is sent out to the synchronizing information comparison unit 20. At time t5, the synchronizing information comparison unit 20 detects a synchronizing information from the newly arrival transmission data ES. Having compared the pseudo synchronizing information continuously for three times, the synchronizing information comparison unit 20 is to detect a synchronizing information from the new transmission data ES again, in the same manner as the case at time t0.

At time t5, the synchronizing information comparison unit 20 is to detect a synchronizing information before the normal synchronizing information DX located at the bit position before a new pseudo synchronizing information GDX5. Therefore, at time t6, the synchronizing information comparison unit 20 detects the normal synchronizing information DX.

In accordance with that the synchronizing information comparison unit 20 has detected the synchronizing information, resetting the counter 116, for example, switches the selecting circuit 402 to output the frame length information LX as the output information LY. And, the stream counter 11 becomes active, in accordance with that the synchronizing information comparison unit 20 has detected the synchronizing information. Thereafter, on the basis of the normal synchronizing information DX, a normal header is analyzed by the header analysis circuit 103. The header analysis circuit 103 calculates a frame length information LX, and outputs the result. In FIG. 14, the frame length information LX calculated on the basis of the normal header is illustrated by the sign L. Accordingly, the normal synchronizing information DX is compared at time t7 with the information held in the register 27 by the synchronizing information comparison unit 20. The operation after time t7 in FIG. 7 becomes the same as that after time t2 in FIG. 7, thus executing the synchronization setup.

As above, even though it detects a pseudo synchronizing information, the frame synchronous circuit 400 in the fourth embodiment confirms that it has detected the pseudo synchronizing information in an early stage, and varies the frame length information LX into "0", whereby the detection of the pseudo synchronizing information becomes possible in an early stage.

Further, in the frame synchronous circuit 400 in the fourth embodiment, the selecting circuit 402 is additionally provided, however the arithmetic operation unit 12 and the selecting circuit 15 become unnecessary. Therefore, the circuit scale thereof can be reduced compared to the frame synchronous circuits of the first through the third embodiments.

Further, in the frame synchronous circuit 400 in the fourth embodiment, the arithmetic operation unit 12 is removed, the frame length information LX is varied into "0", the frame length information is calculated, and the calculated frame length information is varied. Thus, the arithmetic operation time by the arithmetic operation unit 12 becomes unnecessary, and the operation speed is faster than the frame synchronous circuits of the first through the third embodiments. Therefore, in the frame synchronous circuit 400 in the fourth embodiment, the synchronization setup becomes possible in an earlier stage than in the frame synchronous circuits of the first through the third embodiments.

Although the frame synchronous circuits of this invention have been described with the accompanying drawings as above, the construction of the frame synchronous circuit according to the invention is not limited to those in the foregoing embodiments.

As an example, the function value generator 311 in the frame synchronous circuit 300 employs the step function, however it may employ any other functions. And, of the components in each embodiment, the components whose functions can be replaced by a software may be made up by the software.

The arithmetic operation unit 12 is treated as an adder in the embodiments, however the unit may be designed to execute subtraction. And, the counters 50, 60 are treated as up-counters in the embodiments, however they may be down-counters.

And, the transmission gates 14, 23 may be made up with one or several MOS transistors.

As mentioned above, various varies and modifications are possible to the frame synchronous circuit of the invention, without changing the scope and spirit of the invention.

What is claimed is:

1. A frame synchronous circuit that continuously receives transmission data including at least synchronizing information and information indicating frame lengths and detects the synchronizing information of the transmission data to set up a synchronization to the transmission data, the frame synchronous circuit comprising:

an input control unit that sequentially receives the transmission data, and on the basis of the frame length information of a preceding transmission data controls to send out a subsequent transmission data;

a synchronizing information comparison unit that detects an information equivalent to the synchronizing information from the transmission data sent from the input control unit, compares the information detected as the synchronizing information with a predetermined information, and outputs an indication information that indicates a coincidence or non-coincidence of the comparison;

a frame length determination unit that determines a frame length on the basis of the information indicating the frame lengths contained in the transmission data, and outputs the frame length as a frame length information; and a counter that counts a detected number of times of the coincidence and a detected number of times of the non-coincidence in accordance with the indication information, and outputs a control signal when the detected number of times of the non-coincidence reaches a predetermined number of times, wherein the input control unit varies the frame length information inputted from the frame length determination unit in accordance with the control signal, and controls to send out the transmission data on the basis of the frame length information varied.

2. A frame synchronous circuit as claimed in claim 1, wherein:

the counter outputs a coincidence detection signal, when the detected number of times of the coincidence reaches a predetermined number of times by comparing the information detected as the synchronizing information with the predetermined information, and the input control unit controls to continuously output the received transmission data in accordance with the coincidence detection signal.

3. A frame synchronous circuit as claimed in claim 2, wherein the predetermined number of times used for outputting the coincidence detection signal can be set arbitrarily.

4. A frame synchronous circuit as claimed in claim 1, wherein the predetermined number of times used for outputting the control signal can be set arbitrarily.

5. A frame synchronous circuit as claimed in claim 1, wherein the frame synchronous circuit comprises a random number generator that outputs a random number, and when changing the frame length information, the input control unit adds the random number outputted from the random number generator to the frame length determined by the frame length determination unit.

6. A frame synchronous circuit as claimed in claim 1, wherein the frame synchronous circuit comprises a constant generator that outputs a constant, and when changing the frame length information, the input control unit adds the constant outputted from the constant generator to the frame length determined by the frame length determination unit.

7. A frame synchronous circuit as claimed in claim 1, wherein the frame synchronous circuit comprises an additional value generator that outputs an additional value to be added in accordance with the detected number of times of the non-coincidence counted by the counter, and when changing the frame length information, the input control unit adds the additional value outputted from the additional value generator to the frame length determined by the frame length determination unit.

8. A frame synchronous circuit as claimed in claim 1, wherein the frame synchronous circuit comprises an additional value control unit that determines an additional value to be added in accordance with an output number of times of the control signal and outputs a result, and when changing the frame length information, the input control unit adds the additional value outputted from the additional value control unit to the frame length determined by the frame length determination unit.

9. A frame synchronous circuit as claimed in claim 1, wherein the frame synchronous circuit comprises a selecting unit that selectively outputs on the basis of a selecting signal the frame length information determined by the frame length determination unit and an information to bring the frame length information into 0, and the input control unit outputs the selecting signal in accordance with the control signal and uses the information outputted from the selecting unit as the frame length information.

10. A frame synchronous circuit as claimed in claim 1, wherein a number of times counted by the counter is reset, when the synchronizing information comparison unit detects the coincidence.

* * * * *